(12) United States Patent
Yokozawa

(10) Patent No.: US 9,019,538 B2
(45) Date of Patent: Apr. 28, 2015

(54) IMAGE FORMING SYSTEM SHARING RESOURCES

(71) Applicant: Kyocera Document Solutions Inc., Osaka (JP)

(72) Inventor: Yuki Yokozawa, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 13/954,337

(22) Filed: Jul. 30, 2013

(65) Prior Publication Data

US 2014/0036310 A1 Feb. 6, 2014

(30) Foreign Application Priority Data

Aug. 2, 2012 (JP) ................. 2012-171822

(51) Int. Cl.
*G06F 3/12* (2006.01)
*H04N 1/00* (2006.01)
*H04N 1/32* (2006.01)
*G06K 15/00* (2006.01)

(52) U.S. Cl.
CPC ............ *G06F 3/1296* (2013.01); *G06F 3/1225* (2013.01); *G06F 3/1293* (2013.01); *H04N 1/00244* (2013.01); *H04N 1/00278* (2013.01); *H04N 1/00973* (2013.01); *H04N 1/32523* (2013.01); *H04N 2201/001* (2013.01); *H04N 2201/0039* (2013.01); *H04N 2201/0094* (2013.01); *H04N 2201/0082* (2013.01); *G06K 15/4015* (2013.01); *G06F 3/1205* (2013.01); *G06F 3/1206* (2013.01); *G06F 3/1244* (2013.01); *G06F 3/1288* (2013.01)

(58) Field of Classification Search
CPC ... G06F 3/1296; G06F 3/1225; G06F 3/1226; G06F 3/1232; G06F 3/1236; G06F 3/1293; H04N 1/00244; H04N 1/00278; H04N 1/00973; H04N 1/32523; H04N 2201/001; H04N 2201/0039; H04N 2201/0094; H04N 2201/0082; G06K 15/4015
See application file for complete search history.

(56) References Cited

U.S. PATENT DOCUMENTS 5,220,674 A * 6/1993 Morgan et al. ................ 709/223
5,432,899 A * 7/1995 Iwatani et al. ................ 715/207

(Continued)

FOREIGN PATENT DOCUMENTS

| JP | 07-152521 | 6/1995 |
| JP | 2000289267 | 10/2000 |
| JP | 2001249777 | 9/2001 |

OTHER PUBLICATIONS

European Search Report for EP Application No. 13178909.1 dated Oct. 17, 2013, 12 pages.

*Primary Examiner* — King Poon
*Assistant Examiner* — Ted Barnes
(74) *Attorney, Agent, or Firm* — K&L Gates LLP

(57) ABSTRACT

An image forming system includes a print server, a request unit configured to cause the print server to request, from an image forming apparatus recently connected to a network, a resource relating to image forming processing available to the image forming apparatus, a providing unit configured to provide the resource from the image forming apparatus to the print server, through the network, in response to the request from the request unit, and a registration unit configured to store the provided resource in a storage unit and register, in a database, resource information relating to the provided resource, in the print server.

12 Claims, 9 Drawing Sheets

(56) References Cited

U.S. PATENT DOCUMENTS

| | | | |
|---|---|---|---|
| 6,148,346 A * | 11/2000 | Hanson | 719/321 |
| 6,246,485 B1 * | 6/2001 | Brown et al. | 358/1.13 |
| 6,321,266 B1 * | 11/2001 | Yokomizo et al. | 709/226 |
| 7,797,276 B1 * | 9/2010 | Yang | 707/636 |
| 8,120,802 B2 * | 2/2012 | Chrisop et al. | 358/1.15 |
| 8,364,979 B1 * | 1/2013 | Ostrovsky | 713/189 |
| 2001/0028472 A1 * | 10/2001 | Mochizuki | 358/1.14 |
| 2003/0076519 A1 * | 4/2003 | Kadota | 358/1.11 |
| 2004/0205099 A1 * | 10/2004 | Hagiwara | 709/200 |
| 2004/0215613 A1 * | 10/2004 | Venkataraman et al. | 707/4 |
| 2005/0094172 A1 * | 5/2005 | Engelman et al. | 358/1.11 |
| 2005/0270560 A1 * | 12/2005 | Ferlitsch | 358/1.15 |
| 2007/0177206 A1 * | 8/2007 | Miyazawa et al. | 358/1.15 |
| 2007/0211062 A1 * | 9/2007 | Engelman et al. | 345/467 |
| 2007/0229515 A1 * | 10/2007 | Tsukamoto | 345/471 |
| 2009/0097049 A1 * | 4/2009 | Cho | 358/1.11 |
| 2010/0328707 A1 * | 12/2010 | Miyake | 358/1.15 |
| 2011/0022631 A1 * | 1/2011 | Aikawa et al. | 707/770 |
| 2011/0075196 A1 * | 3/2011 | Cogan | 358/1.15 |
| 2012/0030329 A1 * | 2/2012 | Aoki et al. | 709/223 |
| 2012/0036105 A1 * | 2/2012 | Souza et al. | 707/622 |
| 2012/0069385 A1 * | 3/2012 | Von Hatten et al. | 358/1.15 |
| 2012/0086980 A1 * | 4/2012 | Numata | 358/1.15 |
| 2012/0092728 A1 * | 4/2012 | Aoki et al. | 358/1.15 |
| 2012/0127506 A1 * | 5/2012 | Young et al. | 358/1.14 |
| 2012/0127507 A1 * | 5/2012 | Young et al. | 358/1.14 |

* cited by examiner

54b

| RESOURCE | SUPPORTED PRINTER |
|---|---|
| FONT A | PRINTER A, B, C, D |
| FONT B | PRINTER A |
| FONT C | PRINTER A |
| FONT D | PRINTER A |
| MACRO A | PRINTER A |
| MACRO B | PRINTER A |

FIG. 5

IMAGE FORMING SYSTEM SHARING RESOURCES

INCORPORATION BY REFERENCE

This application is based upon and claims the benefit of priority from corresponding Japanese Patent Application No. 2012-171822, filed on Aug. 2, 2012, the entire contents of which are incorporated herein by reference.

BACKGROUND

I. Technical Field

The present disclosure relates to an image forming system causing an image forming processing operation due to an image forming apparatus to be performed using a print server connected to a network.

II. Description of the Related Art

A typical printing system utilizes, as shared resources, font resources for a plurality of printers connected through a print server.

In the typical printing system, the print server transmits, to a printer serving as an output destination, printing character data received from a host computer. At this time, if the printer serving as an output destination is not compatible with the font designated by printing information included in the received printing character data, the print server requests another printer compatible with the designated font to upload the font in each case. After having deployed the uploaded font in print data, the print server causes print processing to be performed. However, in a method where a corresponding font is acquired every time print processing is executed, print performance becomes reduced.

SUMMARY

An image forming system in an embodiment of the present disclosure includes a print server, a request unit configured to cause the print server to request, from an image forming apparatus recently connected to a network, a resource relating to image forming processing available to the image forming apparatus, a providing unit configured to provide the resource from the image forming apparatus to the print server, through the network, in response to the request from the request unit, and a registration unit configured to store the provided resource in a storage unit and register, in a database, resource information relating to the provided resource, in the print server.

A non-transitory computer-readable recording medium in an embodiment of the present disclosure stores a program executable by a computer in a print server. The program includes a first program code to cause the computer to request, from an image forming apparatus recently connected to a network, a resource relating to image forming processing available to the image forming apparatus, a second program code to cause the computer to acquire the resource provided from the image forming apparatus, through the network, in response to the request for the resource, and a third program code to cause the computer to store the provided resource in a storage unit and register, in a database, resource information relating to the provided resource.

A method executed by a print server in an embodiment of the present disclosure includes (i) causing, through a request unit, a print server to request, from an image forming apparatus recently connected to a network, a resource relating to image forming processing available to the image forming apparatus, (ii) providing, through a providing unit, the resource from the image forming apparatus to the print server, through the network, in response to the request from the request unit, and (iii) storing, through a registration unit, the provided resource in a storage unit and registering, in a database, resource information relating to the provided resource, in the print server.

Additional features and advantages are described herein, and will be apparent from the following Detailed Description and the figures.

BRIEF DESCRIPTION OF THE FIGURES

In the accompanying drawings:

FIG. 5 illustrates information resource registered in a resource DB;

DETAILED DESCRIPTION

Hereinafter, embodiments of the present disclosure will be described with reference to drawings.

Figure 1:
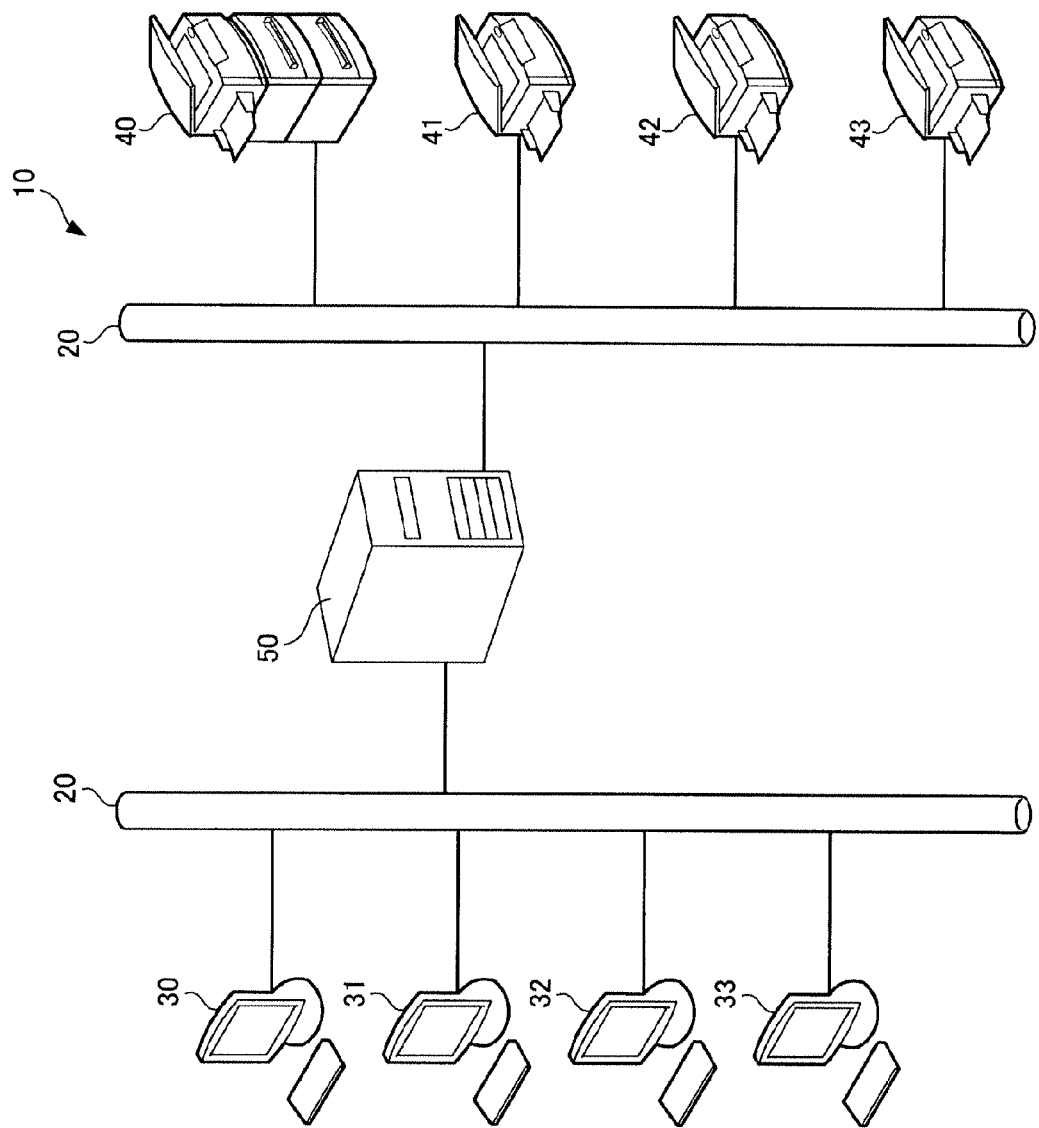
FIG. 1 illustrates a configuration of an image forming system in an embodiment.

FIG. 1 illustrates the configuration of an image forming system in an embodiment.

An image forming system 10 and a program for an image forming system in an embodiment cause an image forming processing operation due to an image forming apparatus to be performed using a print server connected to a network.

The image forming system 10 is configured using a network 20, such as a local area network (LAN), and a plurality of host computers 30 to 33, a plurality of printers (image forming apparatuses) 40 to 43, and a print server 50 that are individually connected to the network 20.

It may be possible to apply desktop PCs or notebook PCs, to the host computers 30 to 33. The host computers 30 to 33 are apparatuses into which pieces of software such as applications and printer driver modules, for example, are loaded (installed). The software operates on operating systems installed into the host computers 30 to 33.

The applications are software programs such as, for example, word processing software and drawing creation software that operate on the operating systems. In each of the host computers 30 to 33, a user inputs character information or drawing information to the word processing software or the drawing creation software, and hence, application data such as a written document or a drawing document is created.

When the application data is printed, the host computers 30 to 33 send print requests to a printer (for example, the printer 40) to cause printing to be executed. Specifically, the host computers 30 to 33 create print data based on the application data, and transmit the created print data to the network 20. The print data is transferred to the printer 40 that serves as an output destination, through the print server 50. In the printer 40, an image forming processing operation is performed based on the transferred print data, and hence, the print data is printed.

The four printers 40 to 43 are connected to the network 20 illustrated in FIG. 1. In an embodiment, the four printers 40 to 43 are divided into, for example, two types. In other words, printer 40, one of the four printers 40 to 43 is, for example, a printer serving as a high-spec model typified by a multiple function peripheral (MFP), and has a printing function, a scanning function, a facsimile function, and a box function. In an embodiment, it may be possible for the printer 40 to print compatible with various types of font or font type as resources for executing the image forming processing operation.

On the other hand, in an embodiment, the other three printers 41 to 43 are printers serving as low-spec models, compared with the printer 40. In other words, the printers 41 to 43 serving as low-spec models have fewer available resources than the printer 40.

When connected to the network 20, the print server 50 functions as a server-type computer. The print server 50 includes hardware resources such as a CPU and a memory device, not illustrated. Using the hardware resources, the print server 50 executes an operating system serving as basic software used for a server, and hence, develops a platform serving as the server-type computer.

Figure 2:
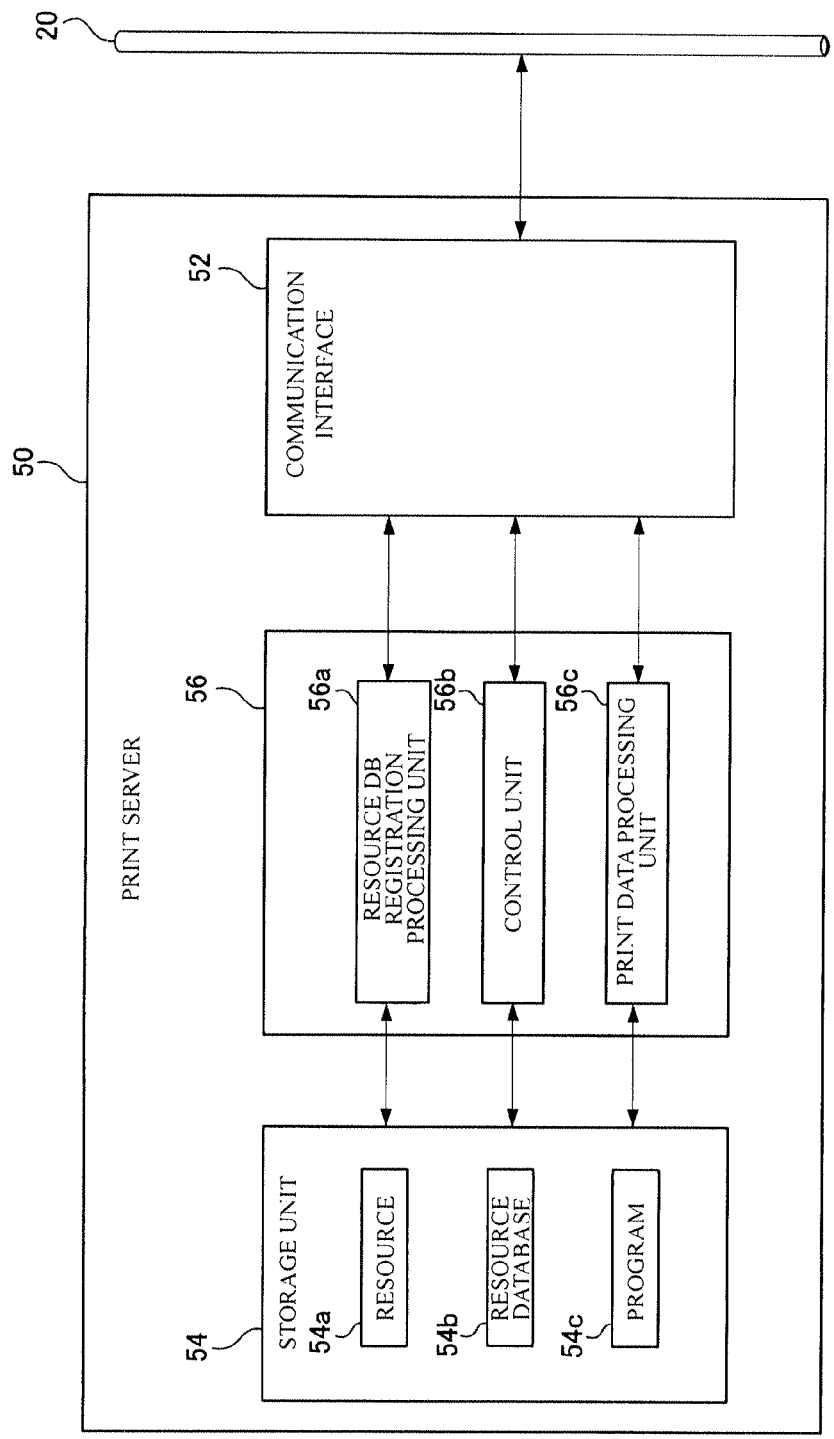
FIG. 2 illustrates a configuration of a print server.

FIG. 2 illustrates the configuration of the print server 50. The print server 50 includes a communication interface 52, a storage unit 54, and a control unit 56. In the print server 50, the storage unit 54 and the control unit 56 execute a program, as a computer.

The communication interface 52 includes a network adapter used for connecting to the network 20. In the communication interface 52, pieces of data transmitted by the host computers 30 to 33 and the printers 40 to 43 are individually transferred to destinations through the network 20.

The storage unit 54 includes storage media such as a read-only memory (ROM) and a random access memory (RAM). In the storage unit 54, a resource 54a used for executing the image forming processing operation, a resource database (resource DB) 54b in which resource information relating to the resource 54a is registered, a program 54c used for the image forming system in the embodiment, and the like are stored.

In the program 54c used for the image forming system in an embodiment, the following processing operations are executed: (1) a registration processing operation for resource information; (2) a processing operation causing the printers 40 to 43 to execute image forming processing operations based on print data; and (3) an update processing operation for the resource DB 54b.

The control unit 56 includes, for example, a processor (CPU), and calls the program 54c for the processing operations in (1)-(3) stored in the storage unit 54 and registers the resource information in the resource DB 54b. Furthermore, the control unit 56 causes the printers 40 to 43 to perform the image forming processing operation, or updates the resource DB 54b. In addition, the control unit 56 controls communication through the communication interface 52.

As a configuration used for executing the program 54b stored in the storage unit 54, the control unit 56 includes a resource DB registration processing unit 56a, a print data processing unit 56b, and a resource DB update processing unit 56c.

The resource DB registration processing unit 56a executes a processing operation for: (i) storing, in the storage unit 54, resources provided by the printers 40 to 43 connected to the network 20 and available to the printers 40 to 43; and (ii) registering, in the resource DB 54b, resource information relating to the provided resources (the resource 54a). In response to print requests from the host computers 30 to 33, the print data processing unit 56b executes a processing operation used for causing the printers 40 to 43 to execute image forming processing operations. In addition, the resource DB update processing unit 56c executes a processing operation used for updating the resource DB 54b.

Figure 3:
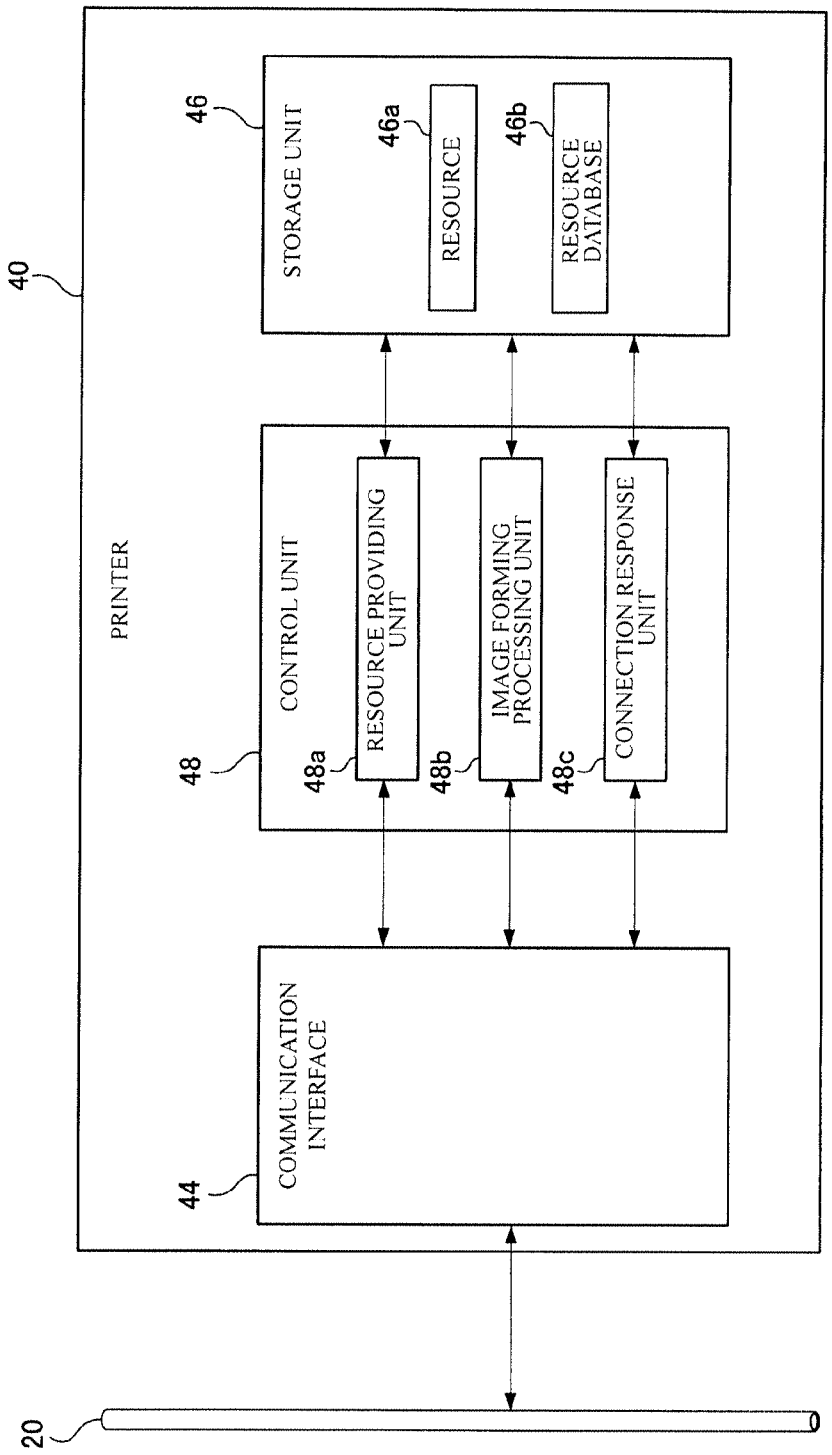
FIG. 3 illustrates a configuration of a printing apparatus.

FIG. 3 illustrates the configuration of each of the printers 40 to 43. In FIG. 3, using the printer 40 as an example, the functional configuration thereof will be described. In addition, as for (1) the registration of the resource information, (2) the execution of the image forming processing operation based on print data, and (3) the update of the resource DB that are to be executed in the image forming system 10 in an embodiment, it is assumed that the printers 40 to 43 share a common basic configuration.

The printer 40 includes a communication interface 44, a storage unit 46, and a control unit 48. In the printer 40, the storage unit 46 and the control unit 48 execute a program, as a computer.

The communication interface 44 includes a network adapter used for connecting to the network 20. The communication interface 44 receives data transmitted by the print server 50, and transmits data to the print server 50.

The storage unit 46 includes storage media such as a read-only memory (ROM) and a random access memory (RAM). In the storage unit 46, a resource 46a available to the printer 40, a resource database (resource DB) 46b in which resource information relating to the resource 46a is registered, a program desired for the image forming processing operation, and the like are stored.

The control unit 48 includes, for example, a processor (CPU). The control unit 48 includes a resource providing unit 48a, an image forming processing unit 48b, and a connection response unit 48c corresponding to the processing operations in (1)-(3) that are to be performed in the image forming system 10 in an embodiment.

As for the registration processing operation for resource information, performed by the print server 50, the resource providing unit 48a provides the resource 46a stored in the storage unit 46, to the print server 50 through the communication interface 44 (a providing unit).

In response to print requests from the host computers 30 to 33, the image forming processing unit 48b executes the image forming processing operation based on the print data transferred from the print server 50.

As for the update processing operation for the resource DB 54b by the print server 50, when the communication interface 44 receives a signal to the effect that connection is to be confirmed, the signal having been transmitted from the print server 50, the connection response unit 48c generates a signal responding to the received signal. The generated response signal is transmitted from the communication interface 44 to the print server 50.

Figure 4:
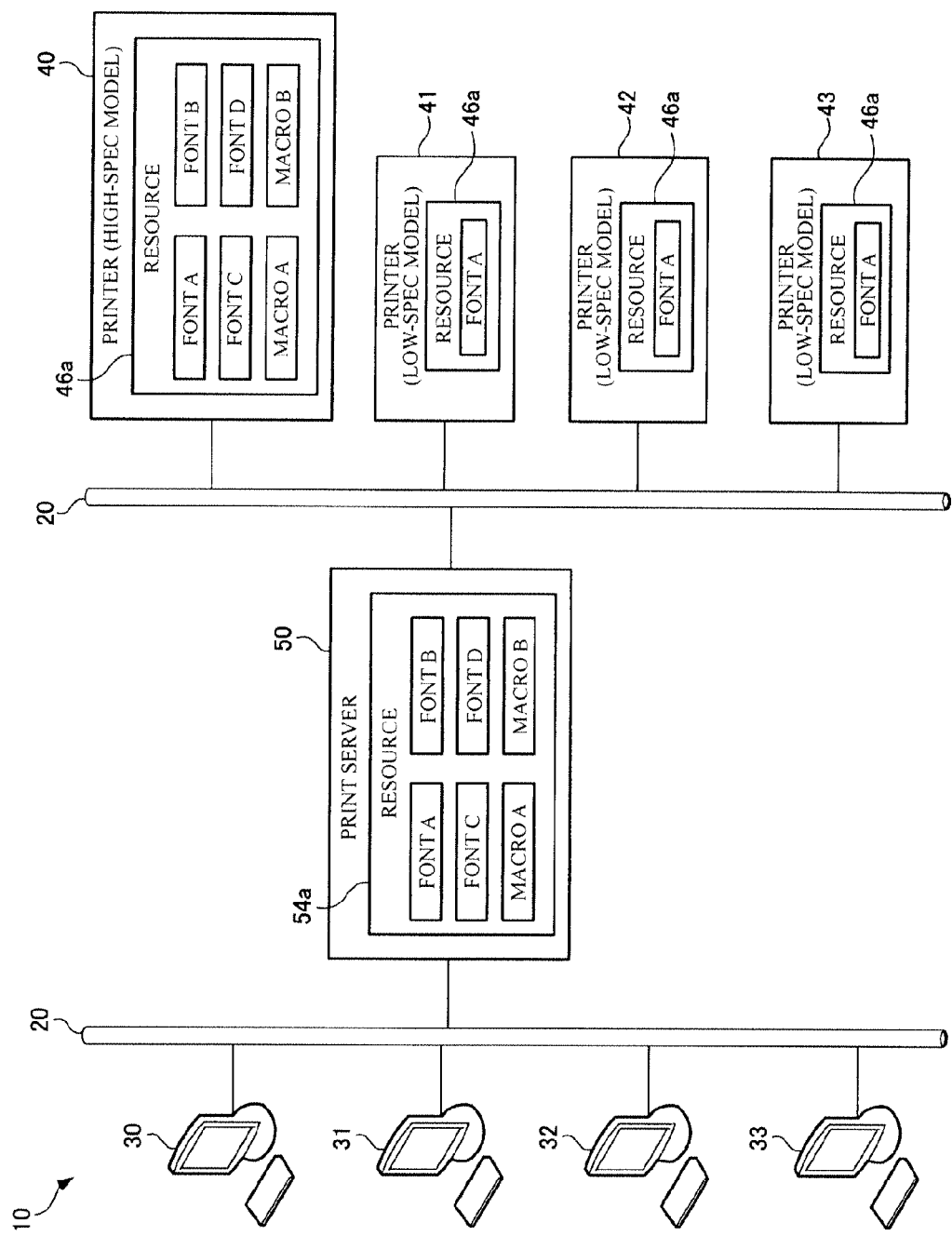
FIG. 4 illustrates a registration state of resource information.

FIG. 4 illustrates the registration state of resource information. FIG. 5 illustrates the resource information registered in the resource DB 54b.

In FIGS. 4 and 5, as examples of resources available to the printers 40 to 43, fonts (macros) are illustrated by type. The printer 40 functioning as a high-spec model includes four types of font (fonts A, B, C, and D) and two types of macro (macros A and B), and is compatible with the fonts and macros. On the other hand, each of the printers 41 to 43 functioning as low-spec models includes one type of font (the font A) and is only compatible with this font.

In the following, first, in the configuration of the image forming system 10 illustrated in FIG. 4, processing will be described that is performed until resources (fonts and macros) available to the printers 40 to 43 and resource information are stored in the storage unit 54 in the print server 50.

First, when each of the printers 40 to 43 is initially connected to the network 20, the resource DB registration processing unit 56a in the print server 50 operates as a request unit requesting the resources 46a relating to image forming processing operations with which these may be individually compatible. This request is performed with, for example, timing at which an IP address or a MAC address, assigned to a printer (for example, the printer 40) initially connected to the network 20, is registered in the print server 50. Alternatively, this may also be performed with arbitrary timing according to an instruction of an administrator administering the print server 50.

In response to requests from the print server 50, the printers 40 to 43 operate as providing units, providing the resources 46a. In other words, the printer 40 provides the font A, the font B, the font C, the font D, the macro A, and the macro B to the print server 50. On the other hand, the printers 41 to 43 provide the font A to the print server 50.

The resource DB registration processing unit 56a in the print server 50 operates as a registration unit that stores, as the resource 54a, the resources 46a in the storage unit 54, the resources 46a being provided by the printers 40 to 43 in response to requests for the resources 46a, and registers resource information relating to the stored resource 54a in the resource DB 54b.

In other words, the resource DB registration processing unit 56a stores (installs), in the storage unit 54, the font A provided by the printers 40 to 43 and the font B, the font C, the font D, the macro A, and the macro B, only provided by the printer 40, and registers the pieces of resource information in the resource DB 54b. Accordingly, in the print server 50, it may become possible to deploy, in the print data, the resource 54a stored in the storage unit 54.

In addition, in an embodiment, as the resource information, type information indicating the type of the resource 54a and identification information used for identifying the printers 40 to 43 serving as providing sources are registered in the resource DB 54b. In the resource DB 54b in FIG. 5, as the type information, the names of fonts, "font A", "font B", "font C", and "font D", are illustrated by type. In addition, as the identification information used for identifying the printers 40 to 43, the names of apparatuses, "printer A", "printer B", "printer C", and "printer D", are illustrated. The names of apparatuses, "printer A", "printer B", "printer C", and "printer D", correspond to the printers 40 to 43, respectively.

Additionally, in addition to the names, the identification information may also be information, such as an IP address or a MAC address that is assigned to each of the printers 40 to 43, capable of identifying each printer.

The type information of the font and the identification information of the printer are associated with each other in the resource DB 54b. In other words, as illustrated in FIG. 5, the font A and the printer A, printer B, printer C, and printer D are associated with each other and registered. In addition, the font B, font C, font D, macro A, and macro B and the printer A are associated with each other.

In the process of the registration processing, the resource DB registration processing unit 56a operates as a resource determination unit, determining whether or not the resource 54a corresponding to the resource 46a provided by each of the printers 40 to 43 is stored by the storage unit 54. In addition, if it is determined that the resource 54a corresponding to the resource 46a provided by each of the printers 40 to 43 is not stored in the storage unit 54, the resource DB registration processing unit 56a stores the provided resource 46a in the storage unit 54, as the resource 54a, and registers, in the resource DB 54b, resource information relating to the resource 54a.

For example, when the printers 40 to 42 illustrated in FIG. 4 are not yet connected to the network 20, the resource 54a is not stored in the storage unit 54 in the print server 50. If the printer 43 has been recently connected to the network 20 in this state, the print server 50 requests the resource 46a from the printer 43. The print server 50 determines whether or not the font A corresponding to the resource 46a provided by the printer 43 in response to this request is stored in the storage unit 54. At this time, since the font A is not stored in the storage unit 54 in the print server 50, the resource DB registration processing unit 56a stores the font A in the storage unit 50. In addition, the resource DB registration processing unit 56a registers, in the resource DB 54b, resource information relating to the stored font A.

In addition, as for the determination, if it is determined that the font A is stored in the storage unit 54, the resource DB registration processing unit 56a registers, in the resource DB 54b, resource information relating to the resources 46a provided by the printers 40 to 43, without storing, in the resource DB 54b, the resources 46a provided by the printers 40 to 43.

Next, an example will be described where the printer 42 is recently connected to the network 20 after the printer 43 has been connected to the network 20.

In this case, since the font A corresponding to the resource 46a provided by the printer 42 has already been stored in the storage unit 54, the resource DB registration processing unit 56a registers, in the resource DB 54b, resource information (the "font A" and the "printer C") relating to the resource 46a provided by the printer 42, without storing, in the storage unit 54, the resource 46a provided by the printer 42.

In this way, in the image forming system 10 in an embodiment, the print server 50 acquires all resources available to the printers 40 to 43 connected to the network 20. Therefore, in the same way as the printer 40, it may become possible for even the printers 41 to 43 that are not compatible with fonts B, C, and D, and the macros A and B to print out print data using the fonts or macros.

A processing operation will be described that is performed until the printer 41 functioning as a low-spec model executes an image forming processing operation after a print request from the host computer 30 illustrated in FIG. 4 has been made. In addition, it is assumed that, in print data created in the host computer 30, printing with the font B is designated.

The communication interface 52 in the print server 50 operates as a reception unit receiving, through the network 20, print data transmitted in response to a print request from the host computer 30 illustrated in FIG. 4.

The print data processing unit 56b in the print server 50 operates as a determination unit that refers to the resource DB 54b based on the resource information of the font B designated by the received print data and determines whether or not the resource information is registered in the resource DB 54b.

In the example, as illustrated in FIG. 5, the resource information (the font B) is registered in the resource DB 54b. In this case, the print data processing unit 56b operates as a print execution unit causing the printer 41 to execute an image forming processing operation, after having deployed, in the print data, the resource font B stored in the storage unit 54.

Specifically, in the print data processing unit 56b in the print server 50, the font B is deployed in the print data, as bitmap data. On the other hand, in the printer 41, the print data deployed as bitmap data turns out to be received from the print server 50. Accordingly, in the printer 41, only by executing the image forming processing operation based on the received print data, it may be possible to print with the designated font.

In addition, the printer 40 serving as a high-spec model, illustrated in FIG. 4, is compatible with the font B, unlike the printer 41. In this case, the print server 50 may also transmit the print data to the printer 40 without deploying the font B in the print data.

In addition, if a resource with which the printers 40 to 43 are not compatible is designated, an alternative resource information is deployed in the print data, in the print server 50 or the printers 40 to 43.

For example, if resource information designated by the print data is resource information (for example, a font Z) not registered in the resource DB 54b, it may be difficult to deploy the font Z in the print data, in the print server 50 and the printers 40 to 43.

On the other hand, instead of the font Z, the print server 50 may select an alternative font (for example, the font A) from among the fonts (the fonts A to D) stored in the storage unit 54. In this case, after having deployed the alternative font in the print data, the print server 50 outputs (transmits) the print data to the printers 40 to 43.

Alternatively, in the print apparatuses 40 to 43, the alternative font may also be deployed in the print data. In this case, the print server 50 transmits print data to the printer 40 without deploying a resource in the print data.

Figure 6:
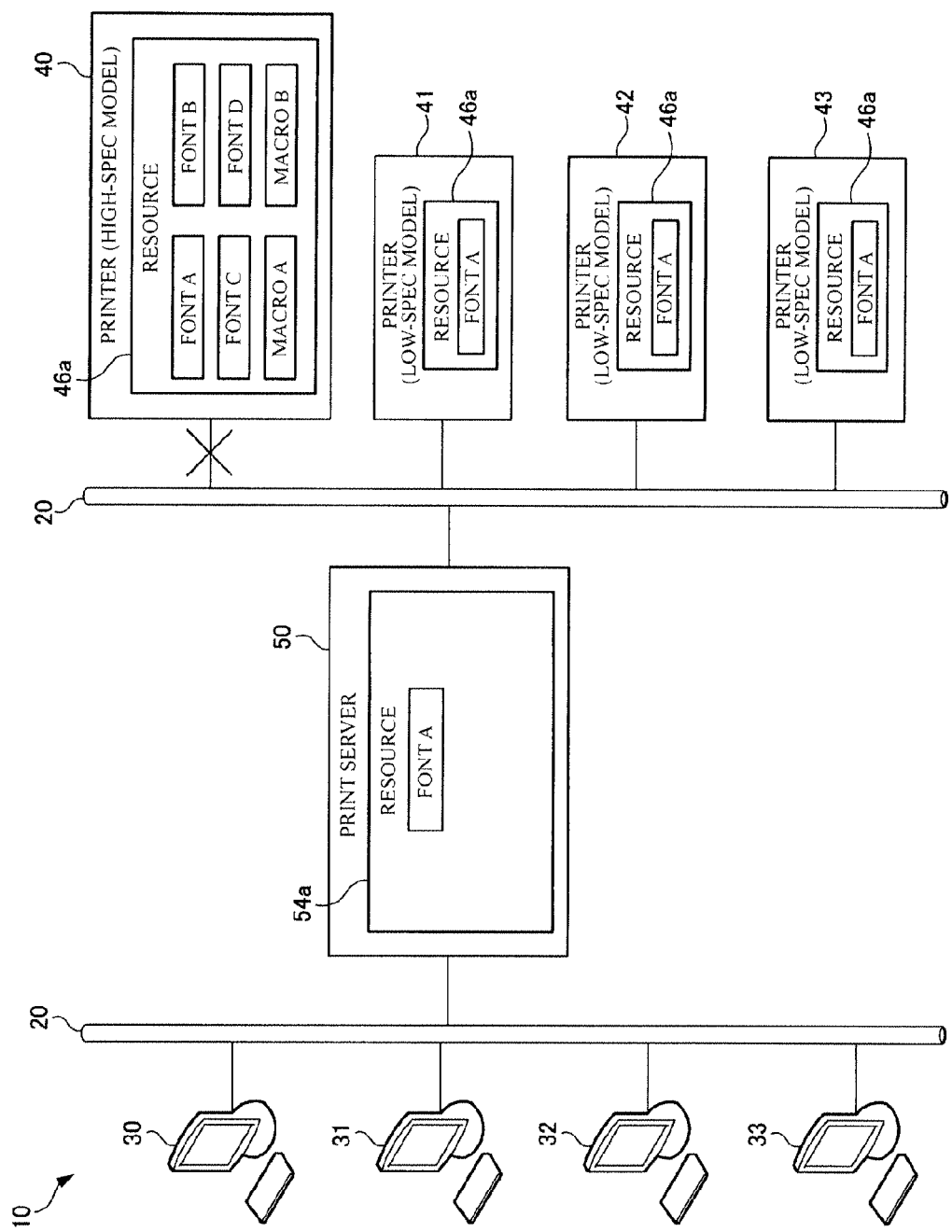
FIG. 6 illustrates a state where a printing apparatus is disconnected from the network.

FIG. 6 illustrates the situation when the printer 40 is disconnected from the network. In FIG. 6, the printer 40 illustrated in FIG. 4 is disconnected from the network 20 which is indicated by a symbol "x".

The resource DB update processing unit 56c in the print server 50 operates as a confirmation unit that confirms whether or not the printers 40 to 43 serving as the providing sources for the resource information registered in the resource DB 54b are connected to the network 20.

Specifically, the resource DB update processing unit 56c outputs (transmits), to the printers 40 to 43 through the communication interface 52, a signal used for confirming whether or not these are connected to the network 20.

After having received the signal, each of the printers 40 to 43 transmits a response signal to the print server 50. Since, in FIG. 6, the printer 40 is disconnected from the network 20, the response signal is not transmitted from the printer 40. On the other hand, the printers 41 to 43 receive the signal from the print server 50, and transmit response signals, to the print server 50. In addition, the confirmation of the connection state may be performed, for example, at specified time intervals. Alternatively, the confirmation of the connection state may also be performed when a change has occurred in a network configuration.

The resource DB update processing unit 56c operates as an update unit that erases one resource 54a from the storage unit 54 and updates the resource DB 54b by deleting, from the resource DB 54b, resource information relating to this if all of printers compatible with the resource in common are disconnected from the network 20.

For example, in the resource DB 54b illustrated in FIG. 5, all of printers associated with the font A in common are the printers 40 to 43 (the printers A to D). On the other hand, each of all of printers individually associated with the fonts B, C, and D, and the macros A and B in common is the printer 40 (the printer A).

On the other hand, in the image forming system 10 illustrated in FIG. 6, the printer 40 is not connected to the network 20. In other words, as for the resource fonts B, C, and D, and the macros A and B, all of printers (the printer 40) compatible with the individual resources are disconnected from the network 20. In this case, the resource DB update processing unit 56c erases, from the storage unit 54, the fonts B, C, and D, and the macros A and B, included in the resource 54a, and deletes the resource information of each of these from the resource DB 54b.

On the other hand, as for the font A of the resource 54a, since the printers 41 to 43 other than the printer 40 are connected to the network 20, all the printers are not disconnected from the network 20. Accordingly, the font A is not erased from the storage unit 54. Therefore, as illustrated in FIG. 6, in the storage unit 54 in the print server 50 after having been updated, the font A is only stored.

In addition, as for the resource DB 54b, the type information "font A" and the pieces of identification information, the "printer A", the "printer B", the "printer C", and the "printer D", of the printers 40 to 43 corresponding to this type information "font A" are registered. If, in the confirmation of a connection state, there is no response from the printer 40, the resource DB update processing unit 56c deletes the identification information "printer A" of the printer 40, registered in the resource DB 54b.

The above is a basic configuration of the image forming system 10. In addition to this, in an embodiment, a program installed into the print server 50 is executed in the computer (the control unit 56 and the storage unit 54), and hence, it may be possible to cause the image forming system 10 to operate. In addition, based on the following description, an example of a procedure will be given where the program used for the image forming system causes the computer in the print server 50 to execute.

Figure 7:
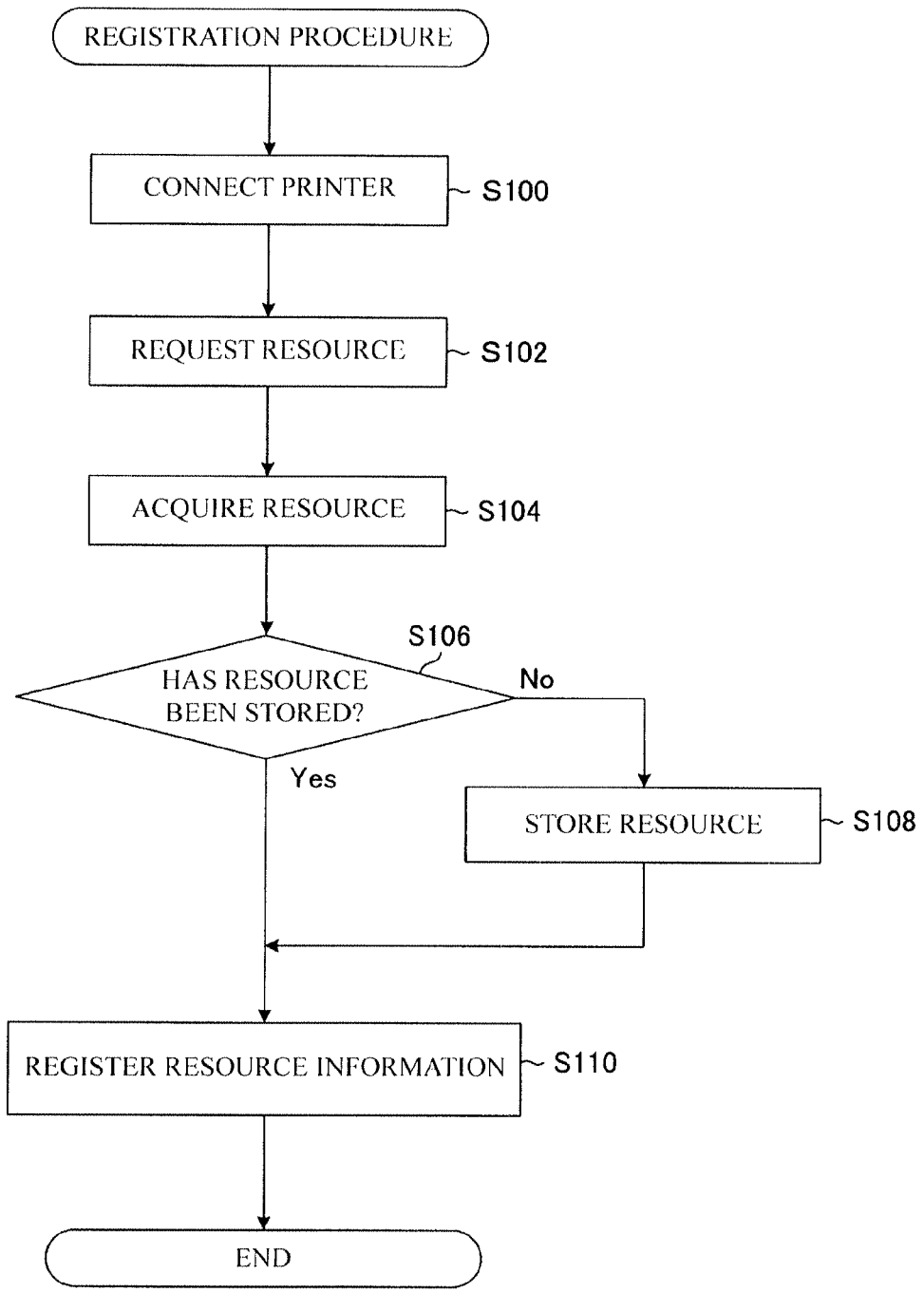
FIG. 7 illustrates a registration procedure for resource information, a computer in a print server is caused to execute.

FIG. 7 illustrates a registration procedure for resource information the computer in the print server 50 is caused to execute. Hereinafter, the description will be performed along the procedure.

Step S100: the printers 40 to 43 are recently connected to the network.

Step S102: at this time, the control unit 56 in the print server 50 requests the resource 46a relating to an image forming processing operation with which each of the printers 40 to 43 is compatible, from each of the printers 40 to 43 recently connected to the network 20.

Step S104: the control unit 56 acquires, through the communication interface 52, the resource information provided by the printers 40 to 43 in response to the request for the resource 46a.

Step S106: the control unit 56 confirms the resource 46a acquired from each of the printers 40 to 43. In other words, the control unit 56 determines whether or not the resource 54a corresponding to the acquired resource 46a has been stored in the storage unit 54.

Step S108: if the resource 54a corresponding to the acquired resource 46a is not stored in the storage unit 54 ("No" in the step S106), the control unit 56 stores the resource 46a in the storage unit 54, as the resource 54a. In addition, the control unit 56 registers, in the resource DB 54b, resource information relating to the stored resource 54a (step S110), and terminates this processing (End).

On the other hand, if the resource 54a corresponding to the resource 46a is stored in the storage unit 54 ("Yes" in the step S106), the control unit 56 only registers, in the resource DB 54b, resource information without storing the acquired resource 46a in the storage unit 54 (step S110), and terminates the processing (End).

Figure 8:
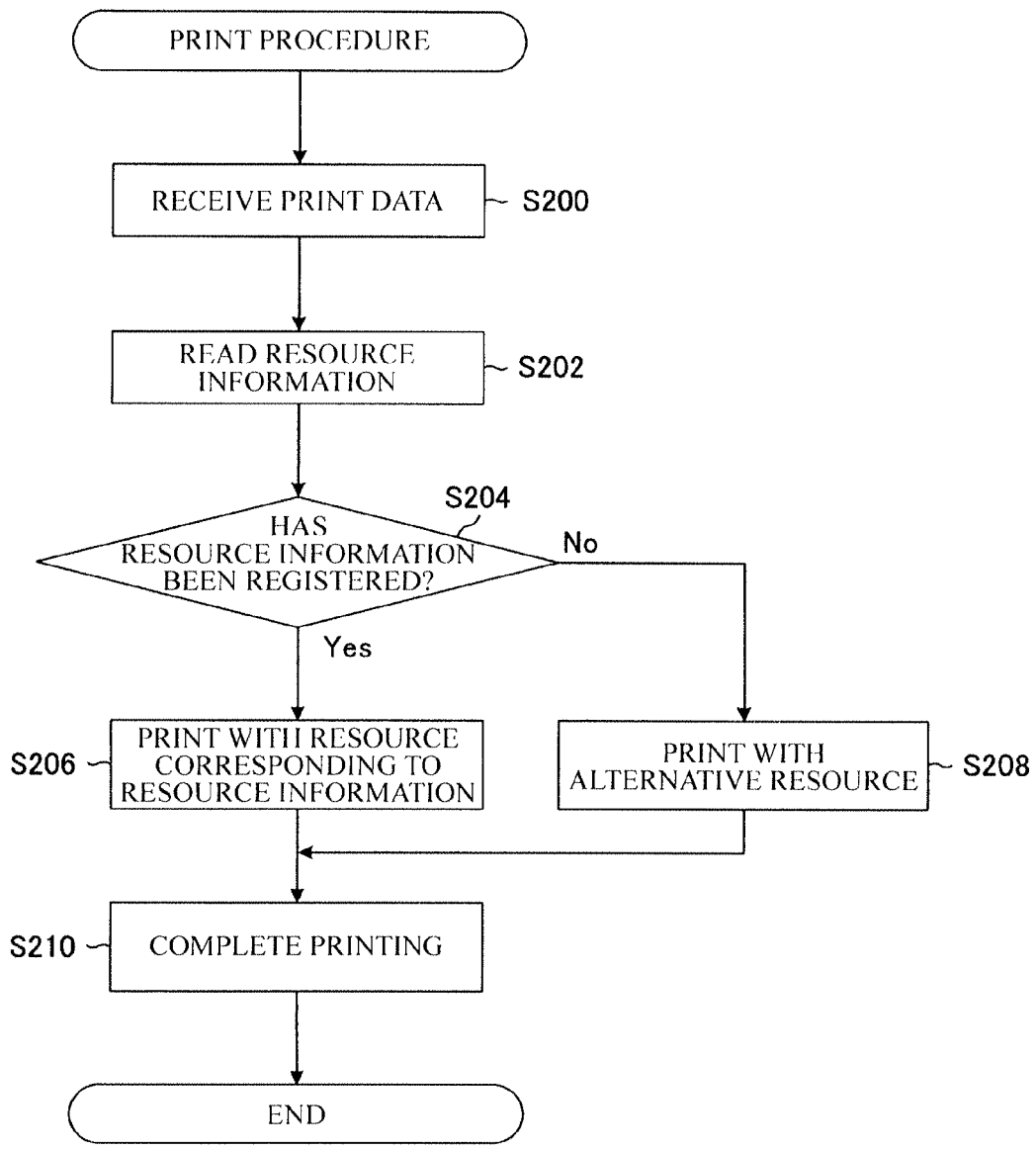
FIG. 8 illustrates a procedure of print processing, a computer in a print server is caused to execute based on a resource DB.

FIG. 8 illustrates a print processing procedure the computer in the print server 50 is caused to execute based on the resource DB 54*b*. The print server 50 controls pieces of print data transmitted from the plural host computers 30 to 33 to the network 20.

Step S200: when printing application data, the host computers 30 to 33 transmit the print data to the network 20. On the other hand, the communication interface 52 in the print server 50 receives the print data through the network 20. The received print data are temporarily stored in, for example, a buffer within the print server 50.

Step S202: the control unit 56 reads resource information included in the received print data.

Step S204: next, the control unit 56 confirms whether or not the read resource information has been registered in the resource DB 54*b*. If the resource information is registered in the resource DB 54*b* (Yes), the control unit 56 causes a printer (for example, the printer 40) to execute an image forming processing operation (print processing operation) after the control unit 56 has deployed the resource 54*a* in the print data, the resource 54*a* being stored in the storage unit 54 so as to correspond to the resource information (step S206).

On the other hand, if the read resource information is not registered in the resource DB 54*b* (No), in other words, resource information relating to a resource not available to the printers 40 to 43 is designated by the print data, the control unit 56 deploys, in place of this resource, an alternative resource in the print data available to the printers 40 to 43 executing image forming processing operations, and, based on this, causes the printers 40 to 43 to execute the image forming processing operations (step S208).

In addition, the deployment of the alternative resource to the print data may also be caused to be executed by the printers 40 to 43.

Step S210: when the image forming processing operations (printing) due to the printers 40 to 43 are completed, the processing is terminated (End).

In this way, all of resources printable in the individual printers 40 to 43 are stored in the print server 50. Accordingly, it may be possible to cause the individual printers 40 to 43 to share printable fonts. Therefore, in the printers 40 to 43, it may be possible to efficiently execute an image forming processing operation.

Figure 9:
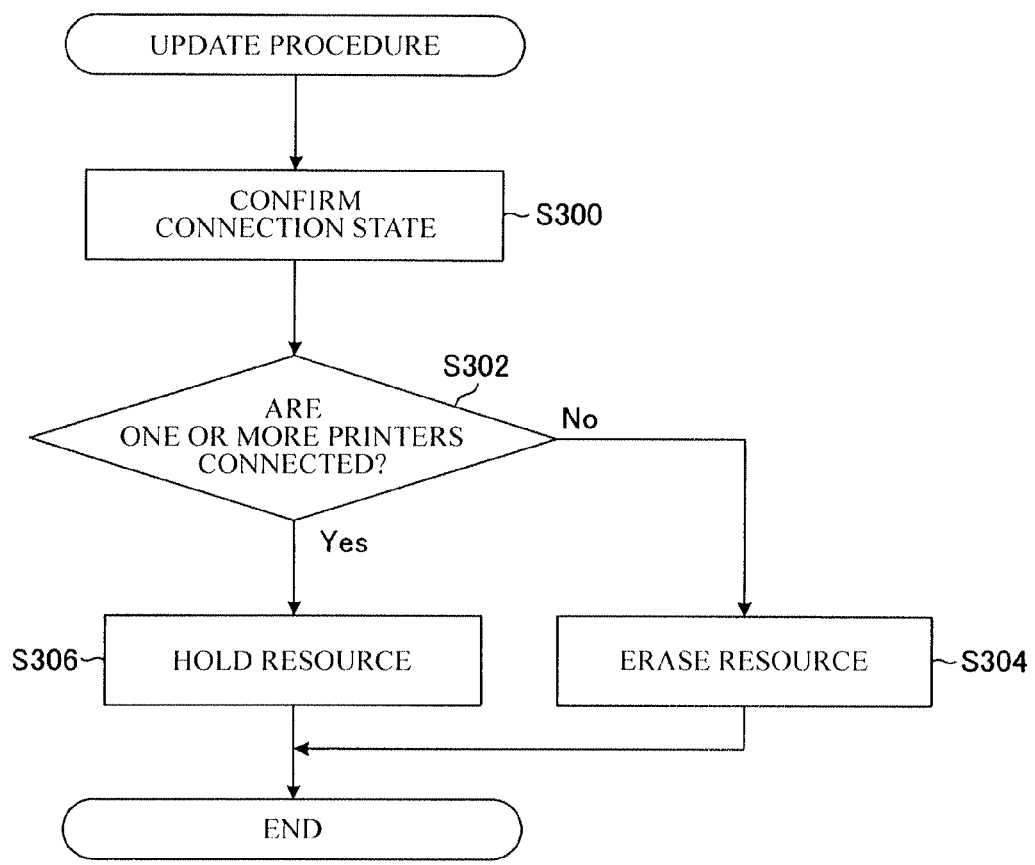
FIG. 9 illustrates an update procedure for a resource DB, a computer in a print server is caused to execute.

Next, a procedure for updating the resource DB 54*b* will be described. FIG. 9 illustrates an update procedure for the resource DB 54*b* the computer in the print server 50 is caused to execute.

Step S300: the control unit 56 confirms whether or not the individual printers 40 to 43 serving as providing sources of resource information registered in the resource DB 54*b* are connected to the network 20.

Specifically, the control unit 56 refers to identification information registered in the resource DB 54*b*, and specifies the printers 40 to 43 corresponding to the identification information. In addition, the control unit 56 transmits, to the individual printers 40 to 43, a signal that is used to confirm whether or not the specified printers 40 to 43 are connected to the network 20. On the other hand, the control unit 56 in the print server 50 confirms whether or not responses to a confirmation request have occurred from the individual printers 40 to 43.

Step S302: based on the signals with which the individual printers 40 to 43 have responded, the control unit 56 determines whether or not one or more printers are connected that share a common resource.

Specifically, it is determined whether or not a response has been received from at least one or more printers from among all of printers compatible with one resource 54*a* in common.

Step S304: if one or more printers are not connected ("No" in the step S302), in other words, a response was not received from all the printers 40 to 43 compatible with resource information in common, the control unit 56 erases the resource 54*a* from the storage unit 54, and terminates the processing (End).

In addition, in concert with this, the control unit 56 deletes the resource information registered in the resource DB 54*b*. Specifically, the type information of a resource and the identification information of the printers 40 to 43 from which no response has occurred are deleted from the resource DB 54*b*.

Step S306: if one or more printers are connected ("Yes" in the step S302), in other words, a response has been received from at least one or more printers from among all of printers compatible in common, the control unit 56 terminates the processing (End) while holding the resource 54*a*.

In this way, according to the image forming system in an embodiment, in the print server, when a printer is caused to execute an image forming processing operation in response to a print request from a host computer, it may be unnecessary to acquire and install a resource from another printer point by point. Therefore, it may be possible to cause a printer to execute an image forming processing operation based on print data without reducing print performance.

In addition, according to the image forming system in an embodiment, if a resource to be deployed in print data is available to one printer connected to a network, it may be possible to obtain the same output result in all the printers. In other words, even if a font designated by print data is not available to a printer, it may be possible for this printer to print with the designated font, only by executing the image forming processing operation on the basis of received print data.

According to the image forming system in an embodiment, when resource information available to individual image forming apparatuses connected to a network is confirmed, if a change occurs in resource information registered in a resource database, it may be possible to update this.

In addition, since the resource database is updated, and hence, an image forming processing operation is not allowed to be executed using resource information incompatible with all of printers connected to the network, it may be possible to strictly manage the resource information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image forming system comprising:
   a print server; and
   a processor that is included in the print server, wherein:
   the processor as a request unit causes the print server to request, when an image forming apparatus that is not connected to a network is connected to the network, a resource relating to image forming processing available to the image forming apparatus;
   the processor as a providing unit provides the resource from the image forming apparatus to the print server, through the network, in response to the request from the request unit;
   the processor as a registration unit stores the provided resource in a storage unit and registers, in a database, resource information relating to the provided resource, in the print server;

the processor as a confirmation unit causes the print server to confirm whether or not the image forming apparatus serving as a providing source of the resource information registered in the database is connected to the network;

the processor as an update unit erases the provided resource from the storage unit and updates the database by deleting, from the database, the resource information relating to the provided resource, if all the image forming apparatuses compatible with the provided resources, in the storage unit, in common are disconnected from the network;

the processor as the registration unit registers, in the database, identification information of the image forming apparatus serving as providing sources of the provided resource;

the processor as the confirmation unit causes the print server to specify the image forming apparatus corresponding to the resource information registered in the database, transmit a confirmation request to the specified image forming apparatus, and confirm whether or not a response to the confirmation request has occurred from one or more of the specified image forming apparatuses; and the processor as the update unit causes the print server to erase the resource corresponding to the confirmation request from the storage unit and delete the resource information relating to the erased resource from the database if the response to the confirmation request has not occurred from all of the specified image forming apparatuses.

2. The image forming system according to claim 1, wherein:
the processor as a resource determination unit determines, in the print server, whether or not the provided resource has already been stored in the storage unit, wherein
if the resource determination unit determines that the provided resource is not stored, the processor as the registration unit stores the provided resource in the storage unit and registers, in the database, the resource information relating to the provided resource.

3. The image forming system according to claim 2, wherein if the resource determination unit determines that the provided resource has already been stored, the processor as the registration unit registers, in the database, the resource information relating to the provided resource without storing the provided resource.

4. The image forming system according to claim 1, comprising:
an interface that receives, in the print server, print data transmitted from a host computer in response to a print request from the host computer, through the network, wherein:
the processor as a determination unit refers to the database based on the resource information designated by the received print data and determines whether or not the resource information is registered in the database; and
the processor as a print execution unit causes the image forming apparatus to execute image forming processing after having deployed, in the print data, the provided resource corresponding to the resource information designated by the print data, in the print server, if, as a result of the determination due to the determination unit, the resource information designated by the print data is registered in the database.

5. A non-transitory computer-readable recording medium storing a program executable by a computer in a print server, the program comprising:
a first program code to cause the computer to request, when an image forming apparatus that is not connected to a network is connected to the network, a resource relating to image forming processing available to the image forming apparatus;
a second program code to cause the computer to acquire the resource provided from the image forming apparatus, through the network, in response to the request for the resource;
a third program code to cause the computer to store the provided resource in a storage unit and register, in a database, resource information relating to the provided resource;
a fourth program code to cause the computer to confirm whether or not the image forming apparatus serving as a providing source of the resource information registered in the database is connected to the network; and
a fifth program code to cause the computer to erase the provided resource from the storage unit and update the database by deleting, from the database, the resource information relating to the provided resource, if all the image forming apparatuses compatible with one of the provided resources, in the storage unit, in common are disconnected from the network, wherein:
the third program code cases the computer to register, in the database, identification information of the image forming apparatus serving as providing sources of the provided resource;
the fourth program code causes the computer to specify the image forming apparatus corresponding to the resource information registered in the database, transmit a confirmation request to the specified image forming apparatus, and confirm whether or not a response to the confirmation request has occurred from one or more of the specified image forming apparatuses; and
the fifth program code causes the computer to erase the resource corresponding to the confirmation request from the storage unit and delete the resource information relating to the erased resource from the database if the response to the confirmation request has not occurred from all of the specified image forming apparatuses.

6. The non-transitory computer-readable recording medium according to claim 5, the program comprising:
a sixth program code to cause the computer to determine whether or not the provided resource has already been stored in the storage unit, wherein
if it is determined through the sixth program code that the provided resource is not stored in the storage unit, the third program code causes the computer to store the provided resource in the storage unit and register, in the database, the resource information relating to the provided resource.

7. The non-transitory computer-readable recording medium according to claim 6, wherein
if it is determined through the sixth program code that the provided resource is stored, the third program code causes the computer to register, in the database, the resource information relating to the provided resource without newly storing the provided resource.

8. The non-transitory computer-readable recording medium according to claim 5, the program comprising:

a seventh program code to cause the computer to receive print data transmitted from a host computer in response to a print request from the host computer, through the network;

an eighth program code to cause the computer to read resource information designated by the received print data, refer to the database based on the read resource information, and determine whether or not the resource information is registered in the database; and a ninth program code to cause the image forming apparatus to execute image forming processing after having deployed, in the print data, the provided resource corresponding to the resource information designated by the print data if, as a result of the determination through the eighth program code, the resource information designated by the print data is registered in the database.

9. A method executed by a print server, comprising:

causing, through a request unit, a print server to request, when an image forming apparatus that is not connected to a network is connected to the network, a resource relating to image forming processing available to the image forming apparatus;

providing, through a providing unit, the resource from the image forming apparatus to the print server, through the network, in response to the request from the request unit;

storing, through a registration unit, the provided resource in a storage unit and registering, in a database, resource information relating to the provided resource, in the print server;

causing, through a confirmation unit, the print server to confirm whether or not the image forming apparatus serving as a providing source of the resource information registered in the database is connected to the network; and through an update unit, erasing the provided resource from the storage unit and updating the database by deleting, from the database, the resource information relating to the provided resource, if all the image forming apparatuses compatible with one of the provided resources, in the storage unit, in common are disconnected from the network, wherein:

the registration unit registers, in the database, identification information of the image forming apparatus serving as providing sources of the provided resource;

the confirmation unit causes the print server to specify the image forming apparatus corresponding to the resource information registered in the database, transmit a confirmation request to the specified image forming apparatus, and confirm whether or not a response to the confirmation request has occurred from one or more of the specified image forming apparatuses; and the update unit causes the print server to erase the resource corresponding to the confirmation request from the storage unit and delete the resource information relating to the erased resource from the database if the response to the confirmation request has not occurred from all of the specified image forming apparatuses.

10. The method according to claim 9, comprising:

determining, through a resource determination unit, in the print server, whether or not the provided resource has already been stored in the storage unit, wherein if the resource determination unit determines that the provided resource is not stored, the registration unit stores the provided resource in the storage unit, and registers, in the database, the resource information relating to the provided resource.

11. The method according to claim 10, wherein if the resource determination unit determines that the provided resource has already been stored, the registration unit registers, in the database, the resource information relating to the provided resource without storing the provided resource.

12. The method according to claim 9, comprising:

receiving, through a reception unit, in the print server, print data transmitted from a host computer in response to a print request from the host computer, through the network;

referring, through a determination unit, to the database based on the resource information designated by the received print data;

determining, through a determination unit, whether or not the resource information is registered in the database; and causing, through a print execution unit, the image forming apparatus to execute image forming processing after having deployed, in the print data, the provided resource corresponding to the resource information designated by the print data, in the print server, if, as a result of the determination through the determination unit, the resource information designated by the print data is registered in the database.

* * * * *